(12) United States Patent
Harooni (10) Patent No.: US 10,108,083 B2
(45) Date of Patent: Oct. 23, 2018

(54) LIGHTING SYSTEMS FOR MICROPHONES AND OTHER OBJECTS

(71) Applicant: Hooshmand Harooni, Los Angeles, CA (US)

(72) Inventor: Hooshmand Harooni, Los Angeles, CA (US)

(*) Notice: Subject to any disclaimer, the term of this patent is extended or adjusted under 35 U.S.C. 154(b) by 17 days.

(21) Appl. No.: 15/360,504

(22) Filed: Nov. 23, 2016

(65) Prior Publication Data
US 2018/0143522 A1  May 24, 2018

(51) Int. Cl.
| | |
|---|---|
| *H04N 9/31* | (2006.01) |
| *G03B 21/14* | (2006.01) |
| *H04R 1/08* | (2006.01) |
| *G03B 29/00* | (2006.01) |
| *H05B 37/02* | (2006.01) |
| *F21V 21/08* | (2006.01) |
| *F21V 33/00* | (2006.01) |
| *F21V 3/02* | (2006.01) |
| *G03B 21/20* | (2006.01) |

(52) U.S. Cl.
CPC .......... *G03B 29/00* (2013.01); *F21V 3/02* (2013.01); *F21V 21/08* (2013.01); *F21V 33/0056* (2013.01); *G03B 21/208* (2013.01); *H04N 9/3155* (2013.01); *H04N 9/3179* (2013.01); *H04R 1/083* (2013.01); *H05B 37/0272* (2013.01); *H04R 1/086* (2013.01)

(58) Field of Classification Search
CPC .... H04N 9/3173; G03B 21/145; G03B 21/14; H04R 1/08; H04R 1/086; H04R 1/083

USPC .......................................................... 353/122
See application file for complete search history.

(56) References Cited

U.S. PATENT DOCUMENTS

| | | | |
|---|---|---|---|
| 6,554,431 B1* | 4/2003 | Binsted | H04N 5/74 348/E5.137 |
| 6,795,715 B1 | 9/2004 | Kubo et al. | |
| 7,103,318 B2 | 9/2006 | Levinsohn | |
| 9,020,180 B2 | 4/2015 | Levinsohn | |
| 9,113,116 B1* | 8/2015 | Al-Saffar | H04N 5/645 |
| 2003/0184575 A1 | 10/2003 | Reho et al. | |
| 2008/0205684 A1 | 8/2008 | Wilson | |
| 2011/0037606 A1 | 2/2011 | Boise | |
| 2011/0054922 A1 | 3/2011 | Gaines et al. | |
| 2012/0004923 A2 | 1/2012 | Gaines et al. | |
| 2012/0098754 A1* | 4/2012 | Kim | H04N 1/0035 345/173 |
| 2013/0107164 A1* | 5/2013 | Verslegers | G02B 6/0065 349/61 |

(Continued)

FOREIGN PATENT DOCUMENTS

| | | |
|---|---|---|
| CN | 201585100 U | 9/2010 |
| GB | 2523464 A | 8/2015 |

(Continued)

*Primary Examiner* — Ryan Howard
(74) *Attorney, Agent, or Firm* — Fish IP Law, LLP (57) ABSTRACT

A lighting system is provided for use with a microphone or other object to provide lighting effects during a performance. The lighting system includes light-control device comprising a light source configured to emit a light, a power source, a controller, and a projector configured to project an image onto a face of the user. The controller is advantageously configured to adjust at least one of a property of the image projected, and a property of the light emitted, optionally based on an input via a sensor.

17 Claims, 6 Drawing Sheets

(56) References Cited

U.S. PATENT DOCUMENTS

2013/0308796 A1* 11/2013 Levinsohn ............... H04R 1/04
                                                                                                           381/122

FOREIGN PATENT DOCUMENTS

| GB | 2503584 B | 9/2015 |
|----|-----------|--------|
| WO | 2014/018998 A1 | 1/2014 |
| WO | 2015/109344 A3 | 7/2015 |
| WO | 2016/044865 A3 | 3/2016 |

\* cited by examiner

LIGHTING SYSTEMS FOR MICROPHONES AND OTHER OBJECTS

FIELD OF THE INVENTION

The field of the invention is lighting devices and systems.

BACKGROUND

The description herein includes information that may be useful in understanding the present invention. It is not an admission that any of the information provided herein is prior art or relevant to the presently claimed invention, or that any publication specifically or implicitly referenced is prior art.

In many instances, special effects are a significant part of a performance by musicians, speakers, comedians, or other performance artists. Special effects, which can include lighting, video, images, sounds, costumes or stage design accompanying a performance, contribute to the overall experience of the audience. However, typically the equipment required for special effects is venue specific and can be very expensive. For example, professional lighting systems can cost hundreds of thousands of dollars. This puts many special effects options out of reach for most performers.

One solution is to provide the performer with a portable and wearable accessory that contributes to the special effects for a performance. One example of a wearable accessory that attempts to provide such special effects is found in U.S. Patent Application 2011/0037606A1 by Boise, which describes eyeglasses having a sound activated lighting system. However, in many situations, having glasses with a lighting system may not be a desirable addition to the special effects of a performance. Additionally, Boise's lighting system does not appear to be made for use with different pairs of glasses such that the lighting system can be easily switched from use with one pair of glasses to use with another pair of glasses.

In another example, U.S. Pat. No. 7,103,318 to Levinsohn teaches a microphone accessory for newscasters with an electronic screen for a news reporter which has means to project advertisements, messages, logos, etc. to viewers (i.e., towards the camera filming the broadcaster). Similarly, U.S. Patent Application 2008/0205684 to Wilson describes a video screen or monitor display attachment for a microphone that projects content to viewers (i.e., towards the camera). However, these known systems draw focus to the microphone and away from the performance and the performer.

Thus, there remains a need for improved lighting devices and systems for performances.

SUMMARY OF THE INVENTION

The inventive subject matter provides lighting systems comprising a light control device, and an adapter or couplers for removably coupling the lighting system to a handheld microphone or other object used by performers. The light control device can include a base, one or more light sources, which can be configured to emit a light that optionally passes through a lighting element (e.g., a diffuser, light cover, light filter), a power source, and a controller configured to adjust a property of the light which is emitted from the light source. The lighting system can also comprise a projector configured to project an image (e.g., still image, video, series of images) onto a user's face, and the controller could be further configured to adjust a property of the image emitted from the projector.

The base and the optional lighting element can comprise any suitable shape. In some preferred aspects, the base and lighting element can each be substantially ring-shaped, and be sized and dimensioned to surround a portion of a microphone's windscreen or grille. The lighting element can optionally be translucent, and additionally or in the alternative, be a diffuser. In some embodiments, the light source is disposed between the base and the lighting element.

In some embodiments, the adapter or couplers are configured to allow the lighting system to be removably attached to a wireless or wired microphone. As used herein, a first object that can "removably attach" to a second object is one that can be attached to and subsequently removed from the second object without causing any significant or noticeable damage. For example, the adapter can comprise first and second couplers configured to attach to a windscreen or grille of the microphone. In some embodiments, the adapter can comprise spring (or otherwise)-biased couplers, a clamp, a strap, hook and loop fasteners, snaps, or any other commercially suitable couplers to attach to a microphone.

All commercially suitable light sources are contemplated, including for example, one or more of an LED, a micro-LED matrix, an LED array, a CFL, a florescent bulb, a tungsten bulb, an incandescent bulb, a halogen bulb, and a PAR-bulb.

The controller can advantageously be configured to adjust at least one property of the light emitted from the light source, for example, based on an input received via a sensor of the lighting system. Additionally or alternatively, the controller can be configured to adjust an image or a property of an image projected by the projector. In some embodiments the sensor can be one or more of a microphone, a proximity sensor, an IR sensor, a temperature sensor, a light sensor, and a camera. For example, a microphone of the lighting system can receive an input of a female voice that is softening over a period of time, which can cause the controller to brighten the light emitted from the light source.

The at least one property of a light can include, among other things, an intensity, a wavelength, an RGB value, a color, a direction, a color, a direction, a color temperature, a time-duration, or a pattern. The at least one property of the image can comprise displaying an image, changing the image, changing the size of the image, changing the speed of a video, or any other suitable property. Contemplated images include, for example, an image of a person, an animal, a design, a face, a facial feature, a map, an animal face, a mask, cosmetics, a skull, a hand, a body of water, or any other object or combination of objects. Contemplated videos include, for example, a series of images of a person, an animal, a design, a body of water, a face, a mapping, a hand, a facial feature, cosmetics, a skull, an animal face, a mask, a rotating image of a face or head, or any other object or combination of objects.

Additionally, or alternatively, the lighting system can further comprise a communication element which can be configured to relay instructions to the controller for controlling the property of light or the property of the image, for example based on a time, an event or a trigger. In some embodiments, the instructions can be contained locally on the lighting system, but may also be contained externally of the lighting system.

It is contemplated that in situations where the instructions are relayed to the communication element from an external source, the communication element may utilize one or more of a Bluetooth signal, a WiFi signal, an IR signal, or other suitable signal (e.g., a short-range signal).

Another aspect of the inventive subject matter provides for an adapter configured to removably attach the lighting system to a microphone. The adapter could be a part of the light control device, or could comprise a separate component that is attached to the light control device. The adapter is coupled to a lighting element and a light-control device. The light-control device has a light source, which is configured to emit a light that passes through the lighting element, a power source, and a controller which adjusts a property of the light emitted from the light source.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1a is a side-elevation view of one embodiment of a lighting system for a portable microphone.

FIG. 1b is a top-plan view of the lighting system of FIG. 1a.

FIG. 1c is a bottom-plan view of the lighting system of FIG. 1a.

FIG. 2 is a top-plan view of the lighting system of FIG. 1a.

FIG. 3 is a bottom-plan view of the lighting system of FIG. 1a.

FIG. 4 is a side-elevation view of the lighting system of FIG. 1a.

FIG. 5 is a side perspective view of the lighting system of FIG. 1a.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems, and methods for a lighting device comprising an attachment mechanism which can be configured to couple to a microphone. The lighting device has a ring-shape lighting element with a plurality of light sources which are configured to shine on the face of a user.

Figures 1A, 1B, 1C:
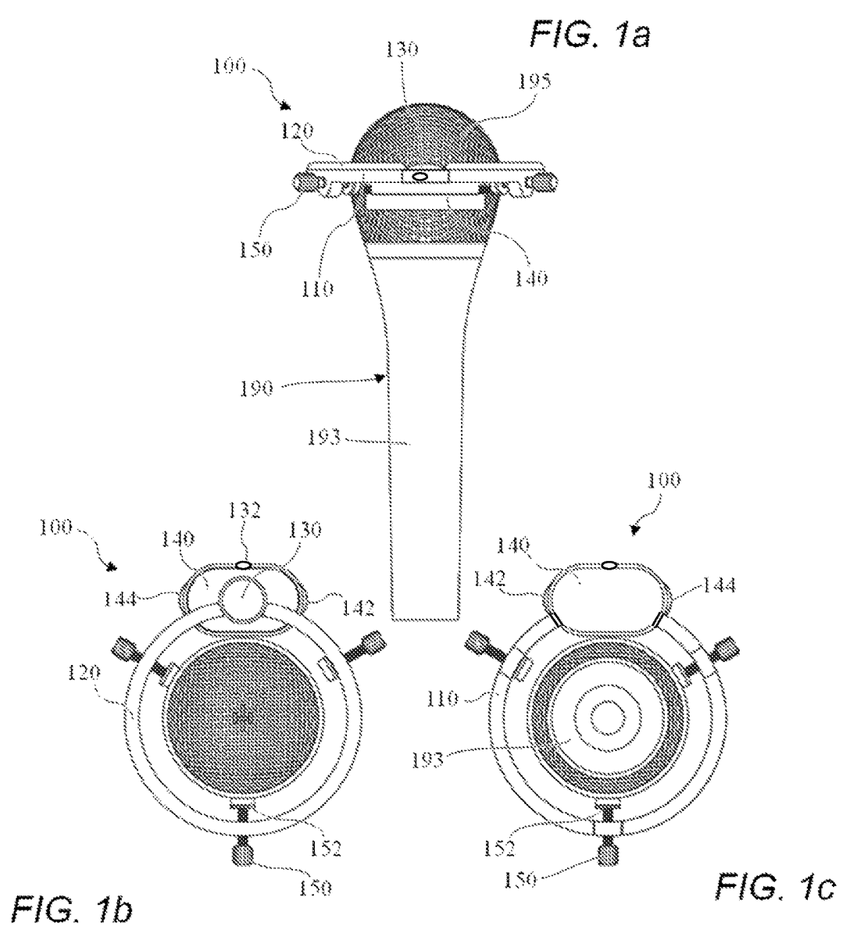

FIGS. 1a-1c depict lighting system 100, which can be coupled to a standard microphone, such as microphone 190. Microphone 190 has a windscreen or grille portion 195 and a handle portion 193. In some embodiments, lighting system 100 is configured to removably couple with microphone 190 via its windscreen or grille portion 195. However, it is also contemplated lighting system 100 can be additionally or alternatively configured to removably couple with microphone 190 via its handle 193. In some contemplated embodiments, lighting system 100 has a base 110, a lighting element 120, a projector 130, a housing 140, and a coupler 150. In the embodiment shown, base 110 includes a set of apertures through which couplers (e.g., 150) can be adjustably and removably secured. For example, the apertures could include female threads, the couplers could include male threads, and the couplers could be thread through the apertures via a mating of the male and female threads. Alternatively, the apertures could include male threads, the couplers could include female threads, and the couplers could be thread through the apertures via a mating of the male and female threads.

FIG. 1b illustrates a top-plan view of lighting system 100, and FIG. 1c illustrates a bottom-plan view. Lighting element 120, projector 130, sensor 132, housing 140, buttons 142 and 144, and couplers (e.g., 150) can be seen in more details, with two of the couplers being tightened against microphone grille portion 195, and one coupler loosened and not contacting the microphone grille portion 195. Each coupler comprises a coupler end 152, which can include a soft padding, a curved or shapeable surface.

In the embodiment of FIGS. 1a-1c, base 110 is substantially ring-shaped. As used herein, the term "substantially ring-shaped" is used broadly to include any shape that has an opening (e.g., a through-hole or recess) sized and dimensioned to allow the base to receive a width of at least a portion of an object it is being removably attached to (e.g., the microphone grille, the widest portion of the microphone grille, the microphone windscreen, the microphone handle). Contemplated base shapes allow for the lighting system to fit around an existing external device, such as a microphone. Thus, and viewed from a different perspective, a substantially ring-shaped base 110 can be circular, oval, square, triangular, etc. and include an opening sized and dimensioned such that the base can be positioned circumferentially around a portion of an existing external device. It is contemplated that base 110 can be made of one or more commercially-suitable materials, such as plastic, PVC, vinyl, rubber, metal alloy, etc. Furthermore, base 110 can be configured to house or position lighting element 120 in a manner such that the light emitting through lighting element 120 is directed opposite to the direction of sound entering the microphone e.g. onto the face of a user holding the microphone. Viewed from a different perspective, one or more light sources (e.g., 222 of FIG. 2) can be housed between base 110 and lighting element 120 and emit light through lighting element 120 in a direction parallel or substantially parallel to the longest length of the microphone (from the top of grille 195 to the bottom of handle 193). Viewed from yet a different perspective, all or substantially all (e.g., at least 90%) of the light emitted from the light sources through lighting element 120 can be directed away from the handle 193 of microphone 190 in a direction opposite the direction in which sound waves hit a diaphragm within the microphone (e.g., orthogonally to the face of the diaphragm).

Lighting element 120, as shown in FIGS. 1a and 1b, is preferably coupled to base 110, and in some embodiments is also substantially ring-shaped. It is contemplated that lighting element 120 houses light sources (e.g., 222 of FIG. 2), and is configured such that light from the light sources passes through lighting element 120. Thus, lighting element 120 can advantageously be composed of a material that allows at least some light to pass through (e.g. is translucent or transparent to at least some degree of some wavelengths of light), or that has holes, perforations, or windows that allow the passage of light (e.g. a screen or a mesh). Lighting element 120 may be made of plastic, glass, acrylic, or any other suitable material that allows at least some light to pass through. In some embodiments, lighting element 120 can be a diffuser.

As shown in FIGS. 1a-c, housing 140 is permanently or removably coupled to base 110 and lighting element 120. In some embodiments, housing 140 contains a power supply (e.g. a battery) for the light sources (not pictured) as well as circuitry and a controller (for controlling the output of light). It is contemplated that there are many ways in which the light output could be controlled. For example, a user may directly control aspects of the light emitted using buttons or dials 142 and 144, which allow a user to control aspects of the light emitted manually. For example, buttons 142 or 144 may turn lighting device 100 on and off, or may adjust properties of the light emitted (e.g. intensity, wavelength, RGB values, color, direction, color temperature, time duration, pattern, image, a sequence of images). In such embodiment, it should be appreciated that the positioning of the buttons (or even the positioning of the entire housing) can be modified such that the performer could easily access the buttons without obvious movements or effort. It should also be appreciated that one, some or all elements of the housing could additionally or alternatively be included in the base of lighting system.

In another example, housing 140 could contain a digital storage medium that contains pre-programmed instructions for controlling the properties of light. The pre-programmed instructions may be hardwired into the device, or may be programmable before a performance. It is also contemplated that the controller can have a communication element which can be configured to receive and relay instructions wirelessly from an external source (e.g., an external database or databases in a single location or spanning multiple locations) in real time via Bluetooth, WiFi, an IR signals, or any other suitable short-range signals. This approach may be desirable in order to coordinate the output of lighting device 100 with other external special effects.

In yet another example, the controller of lighting system 100 can be configured to control the properties of light based on real-time input from a connected sensor or other device. FIG. 1b illustrates sensor 132 coupled to housing 140. It is contemplated that the sensor can be, among other things, a microphone, a proximity sensor, an IR sensor, a temperature sensor, a light sensor, or a camera. In one example, the sensor 132 is a microphone, and the controller can be programmed to vary the intensity or color of the light emitted through lighting element 120 based on the input of sound through sensor 132. The controller may vary the intensity color of the light in relation to the volume, pitch, cadence, etc. of the sound input received through sensor 132. It should be appreciated that the light emitted through lighting element 120 could be adjusted by adjusting the light emitted from the light source, or by adjusting a quality of the lighting element 120.

In one contemplated example, when the sensor is a camera, it is contemplated that the camera can be configured to take an image, series of images, or video recording of the user's face (or any other object). It is contemplated that the image, series of images, or recording of the users face can be used to determine the output of at least one of the lighting element and the projector. In one example, an image or video of the user's face is captured and a face-mapping algorithm, which recognizes the location of the user's facial features, is applied. Then, based on the results of the face-mapping algorithm, the light source is programmed to shine light only on a desired portion of the user's face, for example, the user's cheeks. The camera can provide real-time feedback of where the light is shined on the user's face. In another example, the projector is programmed to overlay an image on the user's face based on feedback from the camera.

As shown in FIGS. 1a and 1b, projector 130 is coupled to housing 140. However, it should be appreciated that one or more projectors could be included in any portion of the lighting system (e.g., on the base, on the lighting element). Projector is configured to project at least one of an image, a series of images, or a video via one or more lenses, and a light, onto the face of the user, or in any other suitable direction or on any other suitable object. For example, when the microphone is positioned below the user's face during a performance, it is contemplated that the projector could be configured to project the image(s) onto the user's face when a first input is received by the sensor, and project the same or different image(s) around the user's face and on a background surface when a second input, different from the first input, is received by the sensor. It is contemplated that the controller can control the output of the projector in any manner as described above.

Figure 2:
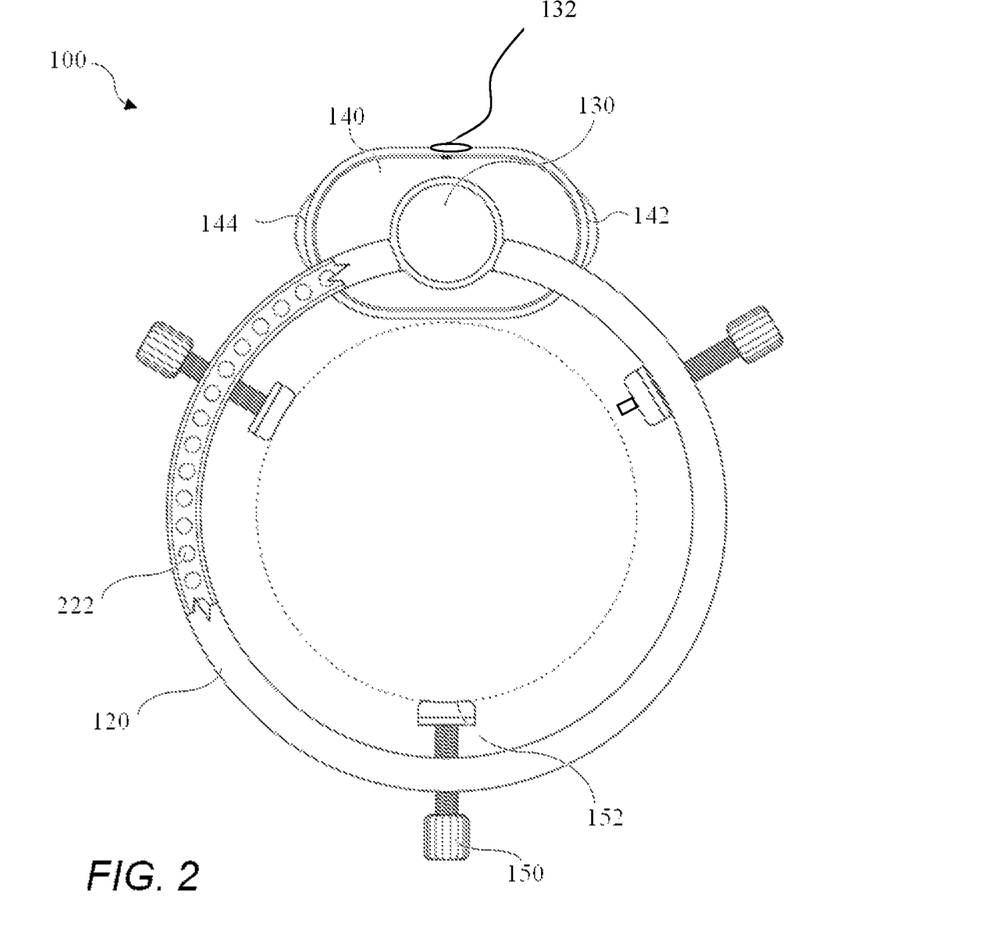
Figure 3:
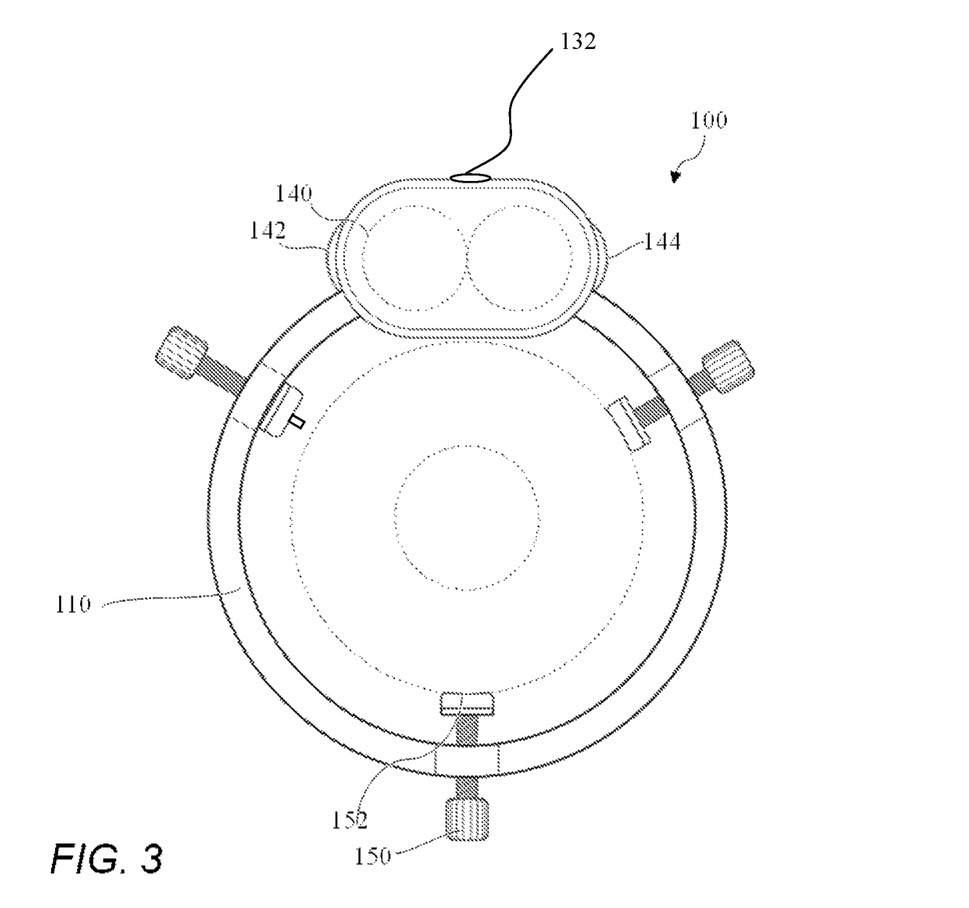

In some embodiments, lighting device 100 has one or more couplers 150, which are configured to removably, adjustably and securely couple lighting element 120 to an external element, such as a microphone. It is contemplated that different coupler configurations may allow lighting device 100 to connect to different external elements, such as to microphones, computer screens, cameras, etc. As shown in FIGS. 1a-c, in one embodiment the couplers 150 are threaded screws, and include a coupler end 152 that is padded. Additionally or alternatively, couplers 152 can comprise rubber, felt, plastic, metal, wood, or other suitable materials. A user can tighten or loosen the screws to attach lighting device 100 to the microphone. As designed, a coupler end 152 can be configured to attach to the mesh windscreen 195 of a microphone, and may have protrusions or tips that engage and lock onto an opening of grille 195 (as shown in FIGS. 2 and 3). Other exemplary couplers for attaching the lighting system to an external element include the use of a spring biased couplers (biased towards the center of lighting element, and configured to be adjusted outwardly to accommodate a width of the external object), a clamp, a strap, or other commercially suitable means.

FIG. 2 depicts a top-plan view of lighting system 100, shown with dotted lines depicting where the microphone would typically be held in place. Lighting system 100 has a base 110, lighting element 120, projector 130, sensor 132, housing 140, buttons 142 and 144, couplers (e.g., 150), and coupler ends (e.g., 152). Additionally, lighting system 100 has a plurality of light sources 222 disposed underneath lighting element 120. It is contemplated that suitable light sources can include one or more of LEDs, micro-LED matrices, LED arrays, CFLs, florescent bulbs, tungsten bulbs, incandescent bulbs, halogen bulbs, and PAR-bulbs.

Figure 4:
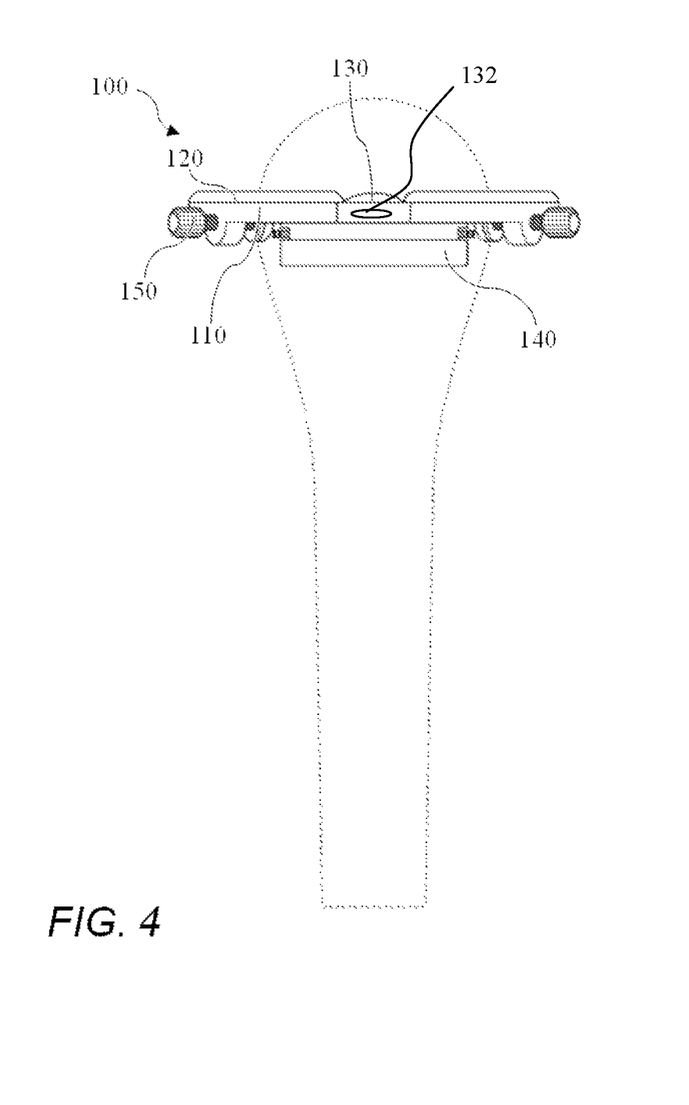
Figure 5:
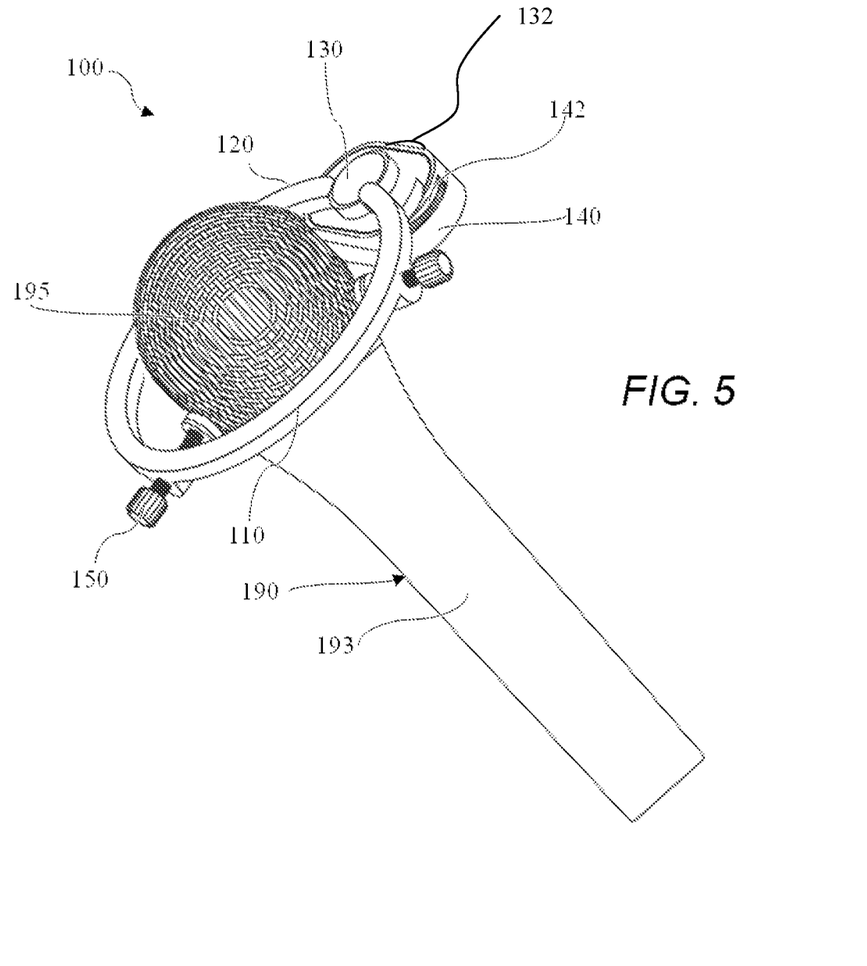

FIG. 3 illustrates a bottom-plan view of lighting system 100, FIG. 4 shows a side-elevation view, and FIG. 5 shows a perspective view, with dotted lines in each figure depicting where the microphone would typically be held in place.

Figure 6:
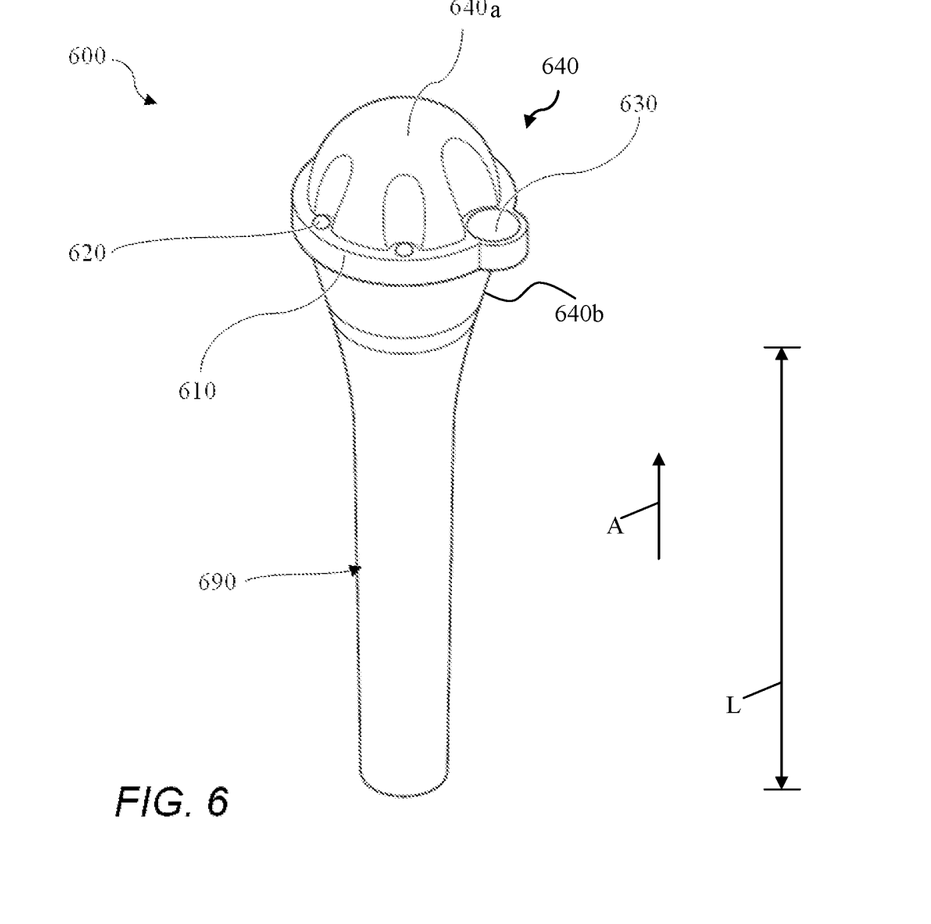
FIG. 6 is a side-elevation view of an alternative embodiment of a lighting system.

FIG. 6 shows an alternate embodiment of a lighting system the inventive subject matter in which the lighting system optionally includes at least one of a windscreen and a grille that can be removably attached to an existing microphone handle. In the embodiment shown, lighting system 600 is coupled to microphone handle 690, and includes a ring-shaped base 610, lighting elements 620 positioned along base 610, and a projector 630. Furthermore, lighting system 600 comprises a windscreen or grille 640, which has a top portion 640a including a plurality of recessed portions or notches through which light can be emitted (via lighting elements 620 or projector 630) in a direction A above base 610, and parallel to a length of the handle L. It should be appreciated that lighting system 600, including its grille or windscreen with notches, advantageously can allow the lights, images, videos, patterns, etc. to be emitted or projected in a smaller surface area (e.g., of the user's face or other object) than lighting system 100 would allow. The notched or recessed portions can act as a guide to a light or image emitted that otherwise would be at least partially blocked by an un-notched windscreen or grille.

In some contemplated embodiments, a bottom portion of windscreen or grille 640b, where included, can be configured to removably couple with each of base 610 (and its lighting elements and projector) a top portion of windscreen or grille 640b, and handle (e.g., via male and female threading, snap fit, etc.) such that the parts can be interchanged. For example, the bottom portion 640b could be de-coupled from base 610 (and thus top portion 640a) via unscrewing the components, and can subsequently be removably attached to a different top portion of a windscreen or grille without the base 610, lighting elements 620 and projector 630. In some contemplated embodiments, the lighting system could comprise a base that directly couples with the handle portion of the microphone, and include only a top portion windscreen or grill without a bottom portion.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A lighting system for a microphone having a grille, comprising:
   a light-control device including a light source configured to emit a light, a power source, a controller, a projector configured to project an image onto a face of the user, and first and second couplers sized and dimensioned to extend through an opening of the grill for removably coupling the light-control device to the microphone; and
   wherein the controller is configured to adjust at least one of a property of the image projected, and a property of the light.

2. The lighting system of claim 1, wherein the light-control device comprises a substantially ring-shaped base and a substantially ring-shaped lighting element, and wherein the light source is housed between the base and lighting element and configured to emit the light through the lighting element.

3. The lighting system of claim 2, wherein at least a portion of the lighting element is translucent.

4. The lighting system of claim 2, wherein the lighting element is a light diffuser.

5. The lighting system of claim 1, wherein the light source comprises one or more of: an LED, a micro-LED matrix, an LED array, a CFL, a florescent bulb, a tungsten bulb, an incandescent bulb, a halogen bulb, and a PAR-bulb.

6. The lighting system of claim 1, wherein the at least one of the property of the image and the property of light is one or more of an intensity, a wavelength, an RGB value, a color, a direction, a color temperature, a time duration, a pattern, and a sequence of images.

7. The lighting system of claim 1, further comprising a sensor and wherein the controller is configured to adjust the at least one of the property of the image and the property of the light based on an input via the sensor.

8. The lighting system of claim 7, wherein the sensor is one or more of a microphone, a proximity sensor, an IR sensor, a temperature sensor, a light sensor, and a camera.

9. The lighting system of claim 1, wherein the controller further comprises a communication element configured to receive instructions and adjust the at least one of the property of the image and the property of light based on the instructions.

10. The lighting system of claim 9, wherein instructions are contained locally inside the light-control device.

11. The lighting system of claim 9, wherein the instructions are relayed to the communication element from an external source.

12. The lighting system of claim 11, wherein the instructions are relayed wirelessly by a short-range signal.

13. The lighting system of claim 1, wherein the light-control device further comprises a base, and wherein the light source and the projector are positioned on a surface of the base.

14. The lighting system of claim 13, wherein the first and second couplers are positioned on the base.

15. The lighting system of claim 14, wherein the first and second couplers each include a male threaded screw that mates with a female threaded hole in the base.

16. A lighting system for a microphone having a handle portion and a windscreen or grill portion, comprising:
- a substantially ring-shaped base sized and dimensioned to fit around the handle portion and having at least one light source that is positioned so as to emit light in a direction that is substantially parallel to a length of the handle portion; and
- a top portion coupled with the substantially ring-shaped base, wherein the top portion is sized and dimensioned to received the windscreen or grille portion and has at least one notch positioned approximate to the at last one light source.

17. The lighting system of claim 16, wherein the substantially ring-shaped base further comprises a projector positioned so as to emit light in a direction that is substantially parallel to the length of the handle portion.

\* \* \* \* \*